Figure 1:
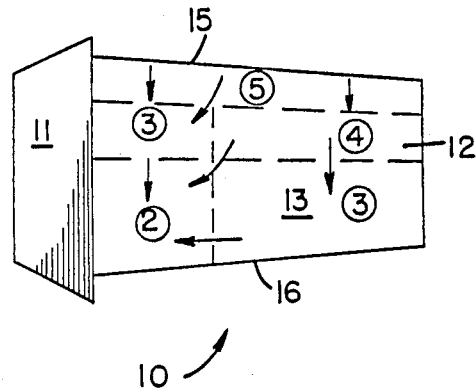

United States Patent [19]

Decko et al.

[11] Patent Number: 4,802,823
[45] Date of Patent: Feb. 7, 1989

[54] STRESS RELIEF SUPPORT STRUCTURES AND ASSEMBLIES

[75] Inventors: Gary W. Decko, Wethersfield; Yao Peng, Woodbridge; Herman Vogel, Newtown, all of Conn.

[73] Assignee: Avco Corporation, Stratford, Conn.

[21] Appl. No.: 191,324

[22] Filed: May 9, 1988

[51] Int. Cl.$^4$ .............................................. F01D 5/18
[52] U.S. Cl. ................................. 416/97 A; 416/39; 416/132 R; 415/135; 415/141
[58] Field of Search .......... 416/132 R, 240 R, 240 A, 416/39, 97 A; 415/12, 135, 140, 141

[56] References Cited

U.S. PATENT DOCUMENTS

| | | | |
|---|---|---|---|
| 3,042,371 | 7/1962 | Fanti | 415/12 X |
| 3,127,093 | 3/1964 | Sudrow | 416/240 R |
| 3,172,621 | 3/1965 | Erwin | 416/97 A X |
| 3,237,918 | 3/1966 | Le Bell et al. | 416/132 R |
| 3,614,260 | 10/1971 | Ellinger | 416/240 R X |
| 4,022,542 | 5/1977 | Barbeau | 416/97 A |
| 4,619,580 | 10/1986 | Snyder | 416/39 X |

FOREIGN PATENT DOCUMENTS

| | | | |
|---|---|---|---|
| 939847 | 11/1948 | France | 416/240 R |
| 78104 | 6/1980 | Japan | 416/39 |
| 248708 | 12/1969 | U.S.S.R. | 416/240 R |
| 577300 | 10/1977 | U.S.S.R. | 416/240 A |
| 352507 | 7/1931 | United Kingdom | 416/240 R |
| 1323883 | 7/1973 | United Kingdom | 416/132 R |

Primary Examiner—Everette A. Powell, Jr.
Attorney, Agent, or Firm—Perman & Green

[57] ABSTRACT

An improved design for a structure such as a turbine vane or blade subjected to extreme temperature levels and/or gradients resulting in extreme deformation stresses within the structure. The present structures comprise an interior skeletal support having a plurality of spaced, flexible support legs which extend out and are attached to spaced areas of a flexible outer surface skin which is subjected to extreme temperature levels or temperature gradients during use. The extreme stresses normally developed by the expansion of the surface skin are avoided by the ability of the skin to move minutely and flex the spaced support legs to variable extents and in predetermined directions.

12 Claims, 2 Drawing Sheets

U.S. Patent   Feb. 7, 1989   Sheet 1 of 2   4,802,823

AIRFOIL PRESSURE (CONCAVE) SURFACE

AIRFOIL SUCTION (CONVEX) SURFACE 4,802,823

STRESS RELIEF SUPPORT STRUCTURES AND ASSEMBLIES

BACKGROUND OF THE INVENTION

The present invention relates to thin-surfaced assemblies, the thin surfaces or skins of which are subjected to severe temperature levels and gradients during use, which cause expansion, distortion and/or erosion of the heated surface areas, and to internal support structures for such assemblies. Most particularly, the present invention relates to improved gas turbine nozzle vanes or blades.

As disclosed in U.S. Pat. No. 3,215,511, nozzle vanes or blades are subjected to a continuous contact of effluent through convective and/or impingement air directed against their leading edges and/or other surfaces, which tends to erode these edges and produces severe localized temperature gradients and/or high temperatures in the vanes or blades at the leading edges and also in contiguous sections of the trailing portions. This causes the surface of the vanes or blades to expand unevenly and creates stresses which can distort or warp the blades, reducing their aerodynamic performance and leading to cracking or permanent warpage and substantial reduction in the useful life of such airfoils.

Some of these problems are reduced, such as by the use of cast cores having ceramic inserts to reduce erosion as in said U.S. Pat. No. 3,215,511, and/or by providing the blades with a hollow case core having a longitudinal aperture for the passage of coolant through the blade, as disclosed in U.S. Pat. No. 4,247,259. The most common system, in use today is the provision of the turbine vanes or blades with internal cooling air passages which communicate with the interior surface and portions of the outer skin to provide impingement and/or film cooling as in U.S. Pat. No. 4,022,542, and/or which communicate with air bleed passages which extend through the outer skin for greater cooling efficiency as in U.S. Pat. Nos. 3,732,031 and 4,118,146, referred to as transpiration cooling. Blades which do not have cast metal cores, as in said Patent 4,022,542, do not have sufficient strength for practical use since their strength depends upon the strength of the facing or skin materials. Known skin materials which are not supported by a flexible core will crack after a relatively short period under the conditions of use.

It is the objective of the present invention to provide a novel design for structures having thin skin surfaces which are subjected to severe temperature levels and gradients during use, which design avoids or compensates for distortional stresses which normally accompany the uneven severe temperature gradients and yet provides sufficient strength and internal support and flexibility for the skin surfaces to prevent cracking thereof during use, i.e., a design which is less concerned with increasing the cooling of the structure than with reducing the adverse stress effects of gradient or uneven heating thereof.

SUMMARY OF THE INVENTION

The present invention relates to improved internal support elements for thin-walled structures such as turbine blades, vanes, airfoils, etc., subjected to severe temperature gradients and/or temperatures over different surface areas thereof resulting in non-uniform expansion movement of said surface areas. More particularly, the present invention relates to such thin-walled structures in which the thin outer wall, preferably a transpiration-cooled wall assembly, is supportably-connected to an internal skeletal support element having a central core containing a plurality of spaced, flexible support legs which are substantially resistant to expansion and contraction along their length but which are flexible in one or more side-to-side directions and/or in a rotational direction to permit minute expansion and/or twisting movement of the thin outer wall relative to the core of the support element, and without significantly affecting the aerodynamic performance of the vane, blade or airfoil, whereby the thin outer wall or wall assembly is supported for the uneven expansion movement caused by severe temperature gradients over different surface areas thereof to absorb or distribute the effects of deformation stresses which normally damage or reduce the useful life of thin-walled structures subjected to such temperature gradients.

According to a preferred embodiment, the present invention relates to gas turbine nozzle vanes or blades having an internal support element comprising a central core having flexible extensions providing spaced, flexible support connections to a thin outer surface and forming one or more coolant passages for receiving and distributing a cooling fluid such as air, and having an outer surface comprising a thin single or multi-ply wall flexibly supported by the flexible extensions in spaced relation to the support core for expansion movement relative thereto and communicating with the coolant passages for the passage of the cooling fluid against and/or through predetermined areas of the outer wall for cooling purposes.

THE DRAWINGS

Figure 2:
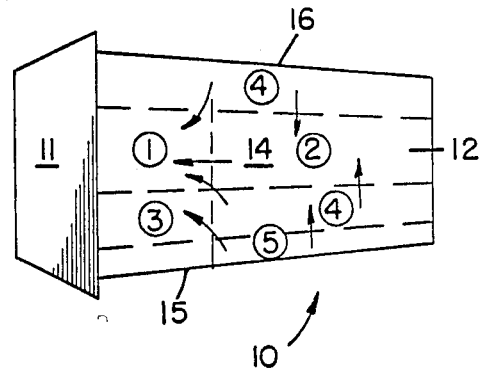
Figure 3:
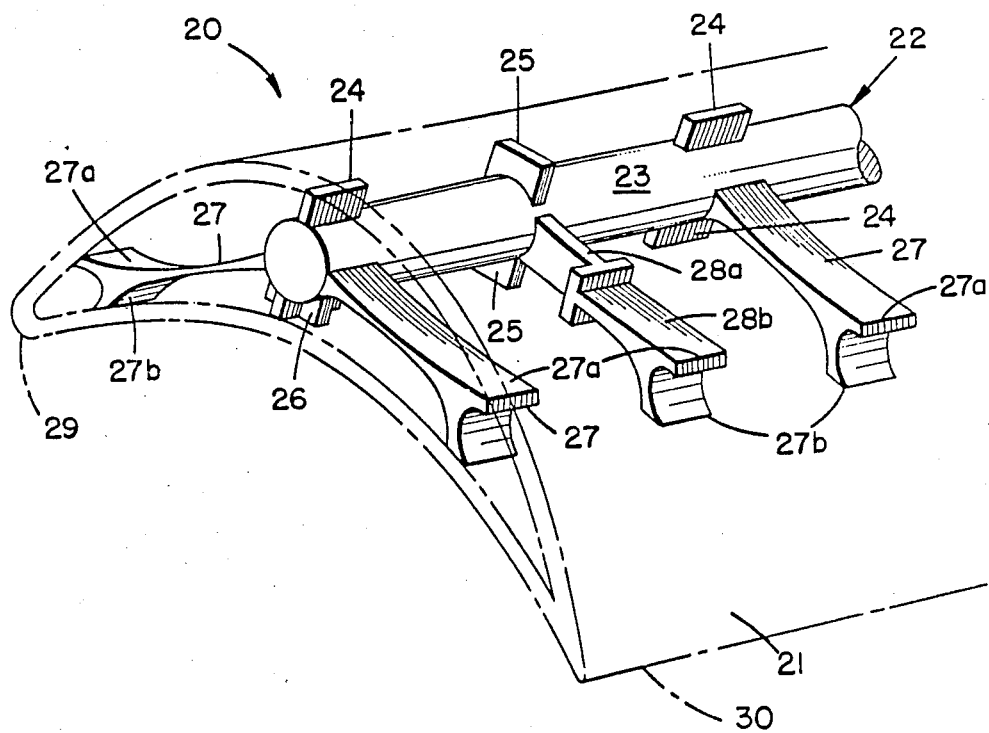
Figure 4:
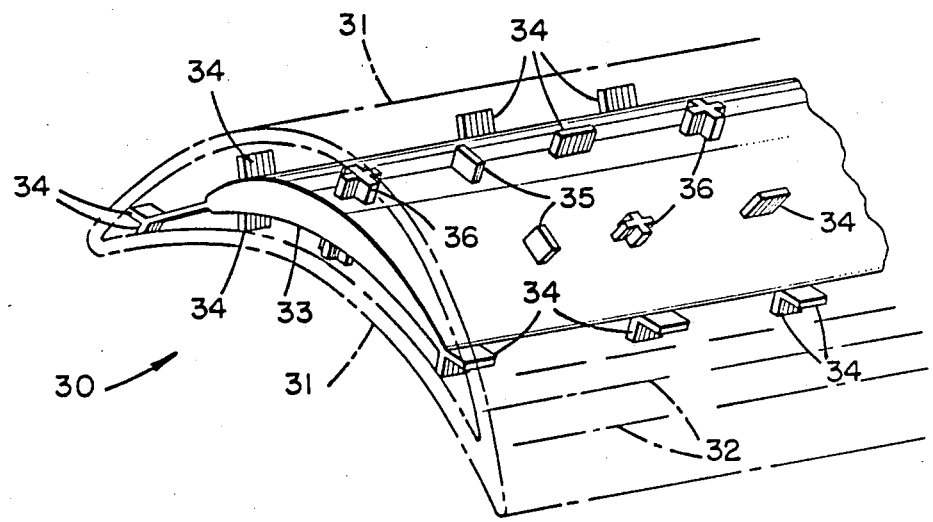

FIGS. 1 and 2 are plan views of the outer pressure and suction surfaces of a thin walled contoured airfoil structure which is subject to severe temperature gradients over different surface areas thereof, such as the convex or suction and concave or pressure surfaces of a turbine blade, illustrating the potential surface temperature gradients in different areas, and the directions of potential expansion movement of the outer surface as may be encountered during use of the airfoil structure;

FIGS. 3 and 4 are perspective views of sections of a turbine vane or blade according to embodiments of the invention;

DISCUSSION OF THE DRAWINGS

FIGS. 1 and 2 illustrate a turbine blade 10 having a root portion 11 or blade stalk designed for engagement within a turbine rotor disc, and a contoured airfoil vane portion 12. The pressure side 13 or concave surface of the contoured vane 12 is illustrated in FIG. 1 and the suction side 14 or convex surface of the vane 12 is shown in FIG. 2.

The leading edge 15 and trailing edge 16 of the vane 12 is shown in FIGS. I and 2 and surface portions of both sides 13 and 14 of the vane, between the edges 15 and 16, are shown divided into hypothetical, representative temperature gradient areas by means of broken lines. The temperature gradient areas are numbered 1 to 5 to illustrate the gradient surface temperatures generated on different surface areas during use, from maximum temperatures in areas 5 to minimum temperatures in areas 1. Thus, maximum temperatures are developed at the leading edge 15 of the vane mainly on the pressure surface 13 along area 5 but extending around to the suction surface 14 along area 5 thereof. Areas of surfaces 13 and 14 adjacent to the hottest areas 5 are gradually less hot in areas 4 and 3, particularly adjacent to the root portion 11 of the blade 10. The coolest areas of the pressure side 13 of the blade 10 are adjacent to the trailing edge 16 whereas the coolest areas of the suction side 14 of the blade 10 are intermediate between edges 15 and 16. High temperatures are generated in area 4 of the suction side 14, along the trailing edge 16.

A plurality of arrows are applied to surfaces 13 and 14 to illustrate the expansion movement of the surfaces in different areas thereof depending upon the relative gradient temperatures developed thereon. It should be understood that the temperature gradient areas 1 to 5 and their relative dimensions and locations will vary with the shape of the turbine blade 10 but FIGS. 1 and 2 are generally representative of conventional blades.

As illustrated by FIGS. 1 and 2, a gradient or unevenly heated surface such as a thin metal sheet or metal cooling sheet assembly will expand to the greatest extent in the hottest areas, and will move to the greatest extent towards adjacent surface areas which are the coolest. This causes some surface areas to distort or twist, as illustrated by the curved arrows in FIGS. 1 and 2. Such expansion and distortion, to different extents and in different surface areas, on both sides of the blade 10, creates substantial internal stresses which can lead to cracking and weakening of the sheet metal forming the skin of the blades and warpage of the blades, resulting in reduced useful life for the blade.

These problems are avoided or substantially reduced by the novel structures of the present invention, embodiments of which are illustrated by FIGS. 3 to 5. FIG. 3 shows a section of a turbine blade 20 with the thin metal outer surface skin 21 in broken lines for purposes of illustrating the flexible central support member 22. Member 22, which may be of cast metal or composite metal-fiber construction, comprises a central elongate core 23 which is integral with the root portion 11 or blade stalk and contains integral flexible skin-support extensions or legs 24, 25, 26, 27 and 28 of different types which are flexible in different directions and/or are twistable and provide stress-absorbing connections between the support core and the outer skin. The elongate forward and rearward legs 27 and 28 extend from the core 23 into the air spaces beneath the leading edge 29 and the trailing edge 30 of the blade 20 and each leg 27 and 28 includes flexible end extensions 27a and 27b which extend at an angle into engagement with the interior surface of the skin 21 which may be a transpiration cooled single or multilayer skin assembly. Engagement of some or all of the extensions with the skin preferably is accomplished by known laser welding techniques or mechanical engagement. The shorter central legs 24, 25 and 26 extend from the core 23 into the more narrow air spaces beneath and above the core 23 into engagement with the interior surface of the skin 21. Legs 24 and 25 are thin, flat metal leafs or tabs which are flexible in the direction perpendicular to their line of attachment to the core 23 and to the skin 21 and are also twistable or rotatable as are legs 26 and 36 to permit the skin 2i to be moved and also pivoted to some extent relative to the support core 23. The movement of the skin is minute, enough to give stress relief to the skin but insufficient to affect the airfoil aerodynamics. Thus, legs 24 permit widthwise or clockwise expansion of the metal skin 21, between the blade edges 29 and 30, and also pivotally-support the skin 2I for some lengthwise or radial movement. In the same manner, legs 25 permit lengthwise or radial expansion of the metal skin 21, between the root and the blade tip and also pivotally-support to the skin 21 for some widthwise/clockwise movement. The X-shaped legs 26 are positioned to engage and support the skin 21 in areas which minimum expansion movement is present but each is flexible about its axis to provide pivotal support and stress torsional relief for the skin 21.

The extensions 27a and 27b on legs 27 and 28 are capable of flexing towards each other to support widthwise expansion of the skin 21 towards the leading edge 29 and the trailing edge 30 of the blade 20 which are superheated areas. In addition, legs 28 are designed to facilitate bidirectional flexing, which is also permitted to a lesser extent by the flexibility of elongate legs 27. Thus, legs 28 comprise flat thin metal stem portions 28a and 28b which extend on planes which are perpendicular to each other, stem portion 28a being flexible in the lengthwise direction of the blade and stem portion 28b being flexible in the widthwise direction of the blade. Correlating FIG. 3 to the temperature and expansion movement patterns of the surface skins 13 and 14 of FIGS. 1 and 2, it will be apparent that the predetermined placement of particular spaced extension arms 24, 25, 26, 27 and 28 on predetermined locations on the central support core 23 will provide a turbine blade, in which the thin outer surface skin is flexibly supported, the ability to accommodate the thermal expansion movement caused during normal use in a manner which avoids or substantially reduces stress and yet preserves the necessary strength of the blade.

As will also be apparent from FIG. 3, the central support member 22 is a skeletal network of a central core 23, which itself is flexible and twistable to some extent, and a plurality of spaced narrow extension legs providing airspace in all directions beneath the outer skin 21. Cooling fluid such as air is circulated through the airspace in the hollow interior of the turbine blade through one or more air passages extending through the root portion 11 or blade stalk to which the central flexible support member 22 or core is fixed. Cooling fluid such as compressed air is injected from a source in conventional manner for the corrective, impingement or transpiration cooling of the thin outer skin 21.

FIG. 4 illustrates a section of a turbine blade 30 according to another embodiment of the present invention. The blade 30 of FIG. 4 comprises a thin metal outer surface skin 31 such as a porous transpiration skin having a plurality of air passages 32, the skin 31 being shown in broken lines for purposes of illustrating the flexible central support structure 33. The support structure 33 of FIG. 4 comprises a solid cast metal core having a shape similar to that of the outer skin 31 but smaller dimensions which permit it to be centered within the airspace beneath the skin 31 in all directions except for the root portion of the blade with which it is integral.

The central support structure 33 also contains a plurality of spaced flexible metal legs 34, 35 and 36 which are integral therewith and which extend out in all directions to engage the inner surface of the skin 31 to which they are welded, bonded, or mechanically attached. Legs 34 and 35 are flat, thin, metal leafs or tabs, similar to legs 24 and 25 of FIG. 3, which are flexible in directions perpendicular to their line of attachment/containment to the support structure 33 or core, i.e., across the width or length of the blade 30, and are also twistable to some extent. Legs 36 are X-shaped metal posts, similar to post 26 of FIG. 3, which are not flexible in any radial direction but are twistable. However, as is true of all of the present support extensions or legs, legs 36 are not expandable or contractable and therefore, they anchor the skin 31 against movement towards or away from the central support 33 while permitting the skin 31 to creep and pivot to some extent relative to the central support 33 to absorb the thermal stresses normally developed by the heat expansion and distortion of the surface skin of a turbine blade and to accommodate the centrifugal loads developed by a rotating turbine blade.

As with the embodiment of FIG. 3, the specific design and placement of the flexible legs 34, 35 and 36 will depend upon the particular temperature gradient area 1 to 5 of FIGS. 1 or 2 to which it is supportingly engaged and the direction in which the outer metal skin 31 lends to creep and/or pivot under the conditions of use. The integral support structure 33 will be custom cast or otherwise formed with the predetermined extension legs in predetermined locatios, depending upon the exact design of the turbine blade being fabricated and its particular requirements.

It will be apparent to those skilled in the art that the cross-sectional shape of the central support structure and of the individual extension arms can be varied within the scope of the present invention, depending upon the cross-sectional shape of the turbine blades or other blades or structures to which the invention is applied and the expansion and/or distortion requirements of the thin outer skin. The core or backbone of the central support structure may be formed to be a relatively rigid support for the flexible, twistable extension arms, or it can be formed to be flexible to some extent to assist the extension arms in absorbing the stresses normally encountered during the expansion and/or twisting movement of the gradiently-heated surface skin. Also the core of the support structure can contain coolant passages communicating through the blade stalk for the distribution of coolant such as compressed air.

While the invention is primarily concerned with eliminating or substantially reducing stresses normally encountered during the use of turbine vanes or blades, it will be apparent that the present concepts also apply to other structures having thin outer metal surfaces or skins which are subject to gradient heating during use, resulting in internal stresses which can crack the outer metal skins and/or result in permanent warpage and degradation of air flow performance. Such other structures include wings and fins for aircraft and space vehicles, fuselages and heat shield members for supersonic aircraft, haat shield or heat exchange components of jet engines, etc.

In all cases, the present flexible support structures have a prolonged useful life because the structures operate relatively stress free as the outer skin is allowed to grow and move in all directions free of the stresses generated when a thin outer skin is anchored to a non-expandable, rigid support strut. Moreover, substantially less cooling flow is needed within the structure since the structure can operate at substantially lower stresses at higher temperatures than conventional structures, approaching the melting temperatures of the metal components.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

What is claimed is:

1. A flexible interior support structure, for absorbing the internal stresses normally developed during the gradient heating of an outer surface layer comprising a thin, elongate, contoured, heat-expandable and/or distortable metal sheathing, said support structure being unitary, and comprising an elongate metallic support core designed to extend along at least a major portion of the length of the elongate contoured element which it is designed to support, and a plurality of spaced flexible metallic eextension arms attached to said core and extending therefrom in different directions for supporting engagement between the ends thereof and a thin contoured outer surface layer to be supported by said support structure in spaced relation to the said elongate metallic support core, said extension arms being flexible and/or twistable relative to said support core to permit heat expansion and/or distortion of the outer surface layer relative to the support core while absorbing the internal stresses normally generated by such expansion and/or distortion.

2. A support structure according to claim 1 designed for the central support of a thin contoured metallic outer peripheral surface layer, wherein said extension arms extend from said support core in all directions surrounding said core for supporting engagement with the outer peripheral surface layer.

3. A support structure according to claim 1 in which said support core has a contoured shape similar to the shape of the contoured outer surface layer which it is designed to support in spaced relation thereto.

4. A support structure according to claim 1 in which said flexible extension arms comprise at least some such arms which are most flexible along the lengthwise direction of the support core, at least other such arms which are most flexible along the widthwise direction of the support core and at least other such arms which provide rotational flexibility, the positioning of the different extension arms being predetermined by the directions of heat-expansion of the portions of the outer surface layer to be supportingly engaged by said extension arms.

5. A stress-resistant, elongate, contoured assembly comprising a thin, contoured outer surface layer comprising a thin, elongate, metallic sheathing which is subjected to gradient heating, causing expansion and/or distortion during use, and an interior metallic support structure for absorbing the internal stresses normally developed by such expansion and/or distortion, said support structure being unitary and comprising an elongate support core which extends along at least a major portion of the length of said metallic sheathing, and a plurality of spaced, flexible, metallic, extension arms, attached to said core and extending therefrom in different directions into supporting attachment with spaced areas of said contoured outer surface layer to secure said surface layer to said interior support structure in spaced relation to said support core, said extension arms being flexible and/or twistable relative to said support core to permit heat expansion and/or distortion of the outer surface layer relative to the support core while absorbing the internal stresses normally generated by such expansion and/or distortion.

6. An assembly according to claim 5 comprising a thin contoured metallic outer peripheral surface layer, and a central support structure comprising extension arms which extend from said support core in all directions surrounding said core for supporting attachment to spaced areas of the outer peripheral surface layer.

7. An assembly according to claim 5 in which said support core has a contoured shape similar to the shape of the contoured outer surface layer to which it is attached and supports in spaced relation thereto.

8. An assembly according to claim 5 in which said flexible extension arms comprise at least some such arms which are most flexible along the lengthwise direction of the support core, at least other such arms which are most flexible along the widthwise direction of the support core and at least other such arms which provide rotational flexibility, the positioning of the different extension arms being predetermined by the directions of heat-expansion of the portions of the outer surface layer to be supportingly engaged by said extension arms.

9. An assembly according to claim 5 comprising a turbine blade in which said support structure is integral with a blade stalk for attaching said blade to a rotor.

10. An assembly according to claim 5 in which said support structure comprises passages communicating with a source of cooling fluid for purposes of cooling said assembly.

11. An assembly according to claim 10 in which the outer surface layer comprises openings communicating with the cooling passages for purposes of cooling the outer surface layer.

12. An assembly according to claim 11 in which said outer surface layer is a porous layer which produces transpiration cooling thereof.

* * * * *